United States Patent
Yamamoto et al.

(10) Patent No.: US 6,320,582 B1
(45) Date of Patent: Nov. 20, 2001

(54) IMAGE GENERATION APPARATUS, IMAGE GENERATION METHOD, GAME MACHINE USING THE METHOD, AND MEDIUM

(75) Inventors: Makoto Yamamoto; Kenji Toma, both of Tokyo (JP)

(73) Assignee: Sega Enterprises, Ltd., Tokyo (JP)

(*) Notice: Subject to any disclaimer, the term of this patent is extended or adjusted under 35 U.S.C. 154(b) by 0 days.

(21) Appl. No.: 08/875,852
(22) PCT Filed: Dec. 6, 1996
(86) PCT No.: PCT/JP96/03598
§ 371 Date: Dec. 4, 1997
§ 102(e) Date: Dec. 4, 1997
(87) PCT Pub. No.: WO97/21194
PCT Pub. Date: Jun. 12, 1997

(30) Foreign Application Priority Data

Dec. 7, 1995 (JP) ................................. 7-319395

(51) Int. Cl.[7] ................................. G06T 15/20
(52) U.S. Cl. ................. 345/427; 345/473; 345/684
(58) Field of Search ................. 345/419, 427, 345/121, 473, 125; 463/32, 33

(56) References Cited

U.S. PATENT DOCUMENTS 5,276,785 * 1/1994 Mackinlay et al. .................. 34/427
5,513,303 * 4/1996 Robertson et al. .................. 34/419
5,850,352 * 12/1998 Moezzi et al. .................. 36/514

OTHER PUBLICATIONS

Electronic Art ("Indianapolis 500, The Simulation"), published 1989.*

* cited by examiner

Primary Examiner—Mark Zimmerman
Assistant Examiner—Kimbinh T. Nguyen
(74) Attorney, Agent, or Firm—Lackenbach Siegel Marzullo Aronson & Greenspan (57) ABSTRACT

In a conventional shooting game machine, it lacked the versatility and appeal of a screen due to the movements of the viewpoint and enemies on the screen being uniform.

The present invention comprises an image generating means, which selects one from a plurality of enemies moving within the game space and generates images of this enemy captured from a viewpoint within an imaginary three-dimensional space, an image generating means which implements the processing of attacking the enemies according to the operation of a gun unit, and a viewpoint moving processing means which, together with making said viewpoint follow the enemy, detects the situation of said enemy and implements the controlling of the viewpoint movement.

17 Claims, 11 Drawing Sheets

IMAGE GENERATION APPARATUS, IMAGE GENERATION METHOD, GAME MACHINE USING THE METHOD, AND MEDIUM

FIELD OF THE INVENTION

The present invention relates to an image generating device, a medium, a game machine and an image generating method, and more particularly, it relates to an image generating device, a medium, a game machine and an image generating method relating to computer graphics.

BACKGROUND ART

With the progress of computer graphics technology in recent years, game devices and simulation devices have come into wide, general use. Among the game devices, the popularity of gun shooting games, wherein targets (enemies) are shot down, remains strong. Generally, this game device comprises a gun unit, CPU for graphics processing, a monitor, etc., and implements the processing of shooting down the enemies on the monitor according to the signal from the gun unit operated by the player.

As a typical example of a conventional gun shooting game, there is "Virtual Cop" (trademark) manufactured by SEGA ENTERPRISES, LTD. The object of this game is to compete for scores by shooting down the enemies which appear in the imaginary three-dimensional space on the display using a gun unit. In this game, the enemies appear on the display in a predetermined position and in a predetermined timing, whereby the player operates the gun unit with these enemies being the target. That is, the player shoots down the enemies which are indicated each time in a predetermined position and timing on the display. Further, when the player aims the gun unit toward an enemy, the viewpoint on the display approaches the enemy, thus, the enemy is largely indicated on the display.

Of the other conventional gun shooting games, there is one in which the enemies move on the screen according to the attacks made by the player. In this game, when the player attacks an enemy, a prescribed moving route is selected at the branch point of the predetermined moving route, and the enemy moves according to this selected moving route. Similar to the enemy movements, the viewpoint also moves in predetermined directions.

However, the above conventional image generating devices held the problems indicated below.

Foremost, since the movement of the viewpoint was uniform, the changes on the screen were limited. The two types of games mentioned above were both of which the viewpoint-moved in predetermined directions. Therefore, if the player repeatedly played the game, a similar screen would be repeatedly indicated each time, thus, making the changes in the game a limited one.

Secondly, it was difficult to capture the enemies, etc., from a position of an optimum viewpoint. In conventional image generating devices, the viewpoint moved uniformly against the enemies from a predetermined direction. Therefore, it was not possible to move the viewpoint to an optimum position against the enemies according to the changes of the enemies, thus, making it difficult to indicate an appealing screen desired by the player.

Thirdly, due to the movement of the enemies being uniform, a dull game development was being repeated. As mentioned above, in the conventional game devices of gun shooting, the enemies made predetermined movements and could not help but make the game development a dull one.

The present invention was made in consideration of the problems mentioned above, and a first object of the present invention is to provide an image generating device and an image generating method capable of actualizing a screen with changes by implementing various viewpoint movements.

A second object of the present invention is to provide an image generating device and an image generating method capable of indicating an appealing screen by implementing an optimum viewpoint movement according to the game development.

A third object of the present invention is to provide an image generating device and an image generating method capable of actualizing a game development with abundant changes by giving variety to the movement of the enemies.

DISCLOSURE OF THE INVENTION

The image generating device according to the present invention is an image generating device which generates images of moving objects within the imaginary three-dimensional space captured from the viewpoint within the imaginary three-dimensional space, and comprises a viewpoint moving processing means which together with having the viewpoint follow the moving objects, detects the situations of the moving objects and controls the movement of the viewpoint.

In the image generating device according to the present invention, the above viewpoint moving processing means calculates the acceleration speed of the viewpoint, and moves the viewpoint in a range wherein the acceleration speed does not exceed a prescribed value.

In the image generating device according to the present invention, the above viewpoint moving processing means changes the position of the viewpoint if the viewpoint is positioned on the same coordinates in excess of a prescribed time.

In the image generating device according to the present invention, the above viewpoint moving processing means moves the viewpoint in the vicinity of the imaginary spherical surface with the moving object in the center.

In the image generating device according to the present invention, the above viewpoint moving processing means decreases the radius of the spherical surface together with the decrease in the number of moving objects.

The medium according to the present invention stores the program which functions a computer as the viewpoint moving processing means.

A medium includes, for example, a floppy disk, hard disk, magnetic tape, photomagnetic disk, CD-ROM, DVD, ROM cartridge, RAM memory cartridge with battery back-up, flash memory cartridge, fixed RAM cartridge, etc. Further, it includes telecommunication mediums such telephone circuits, etc., which are wire communication mediums, and microwave circuits, etc., which are radio communication mediums. The internet is also included in the telecommunication medium stated herein. A medium has information (mainly digital data or programs) stored therein by some physical means, and is capable of implementing the prescribed functions in a processing device such as a computer, exclusive processor, etc. That is, any means which downloads the program onto a computer and executes the prescribed functions is fine.

The image generating device according to the present invention comprises a target deciding means which selects one from the plurality of moving objects based on predetermined standards and targets this moving object against the viewpoint.

In the image generating device according to the present invention, the above target deciding means targets the moving object which was attacked within the plurality of moving objects against the viewpoint.

In the image generating device according to the present invention, the above target deciding means targets the moving object nearest to the impact area within the plurality of moving objects against the viewpoint.

In the image generating device according to the present invention, the above target deciding means moves the target against the viewpoint to a moving object among another moving object group if the number of moving objects in the moving object group composed of a plurality of moving objects becomes less than the prescribed value.

The medium according to the present invention stores the program which functions a computer as the above target deciding means.

The image generating device according to the present invention indicates the moving objects according to the situations of such moving objects in the imaginary three-dimensional space.

In the image generating device according to the present invention, the above moving object controlling means withdraws the moving object away from the impact area if the point of impact is within the area of the prescribed range from the moving object.

In the image generating device according to the present invention, the above moving object controlling means moves the other moving objects toward a moving object attacking against the viewpoint.

The medium according to the present invention stores the program which functions a computer as the above moving object controlling means.

The game machine according to the present invention comprises an indicator, an operating section, and an image generating device which generates images of moving objects moving within the imaginary three-dimensional space captured from the viewpoint within the imaginary three-dimensional space, wherein such image generating device which is one of the aforementioned devices, generates images based on the output signal of the operating section, and indicates the generated images on the indicator.

The game machine according to the present invention comprises an indicator, an operating section, and an image generating device which generates images of moving objects moving within the imaginary three-dimensional space captured from the viewpoint within the imaginary three-dimensional space, wherein such operating section is a shooting means, and wherein such image generating device generates images based on the output signal of the operating section, indicates the generated images of such indicators, and indicates the airframe shot by the operation of the shooting means as well as the plurality of moving objects, and further, moves the viewpoint so that a moving object selected within the plurality of the moving objects based on predetermined standards is positioned near the center of the screen.

In the game machine according to the present invention, the above image generating device moves the viewpoint so that the moving object which is the subject of an attack is positioned near the center of the screen, In the game machine according to the present invention, the above image generating device moves the viewpoint so that the moving object near the indicated impact among the plurality of moving objects indicated on the screen is positioned near the center of the screen.

In the game machine according to the present invention, the above image generating device moves the viewpoint to another moving object if the airframe hits the moving object target.

In the game machine according to the present invention, the above image generating device moves each of the plurality of moving objects away from the impact area if the impact of the airframe is between the plurality of moving objects.

In the game machine according to the present invention, the above image generating device makes the moving object detour the obstacle if an obstacle exists along the moving path of the moving object.

In the game machine according to the present invention, the above image generating device generates a screen so that the other moving objects support the moving object being attacked within the plurality of moving objects.

In the game machine according to the present invention, the above image generating device generates a screen so that if the moving object being attacked within the plurality of moving objects is damaged, the moving object evacuates.

The image generating method according to the present invention comprises a following step, which makes the viewpoint follow the moving object moving within the imaginary three-dimensional space, an attacking step, which implements the processing of attacking such moving object according to the operations from the operating device, and an indicating step, which generates images of moving objects moving within the imaginary three-dimensional space captured from the viewpoint within the imaginary three-dimensional space.

The medium according to the present invention stores the program which makes a computer execute the following step, the attacking step, and the indicating step.

The image generating method according to the present invention comprises a following step which selects one from the plurality of moving objects moving within the three-dimensional space and makes the viewpoint follow the moving object, a movement controlling step which detects the situations of the moving objects and controls the movement of the viewpoint, and an indicating step which generates images of the moving objects moving within the three-dimensional space captured from the viewpoint within the imaginary three-dimensional space.

The medium according to the present invention stores the program which makes a computer exedute the following step, the movement controlling step, and the indicating step.

BEST MODE FOR CARRYING OUT THE INVENTION

Below, the embodiment of the present invention is explained by referring to the drawings.

Structure

Figure 1:
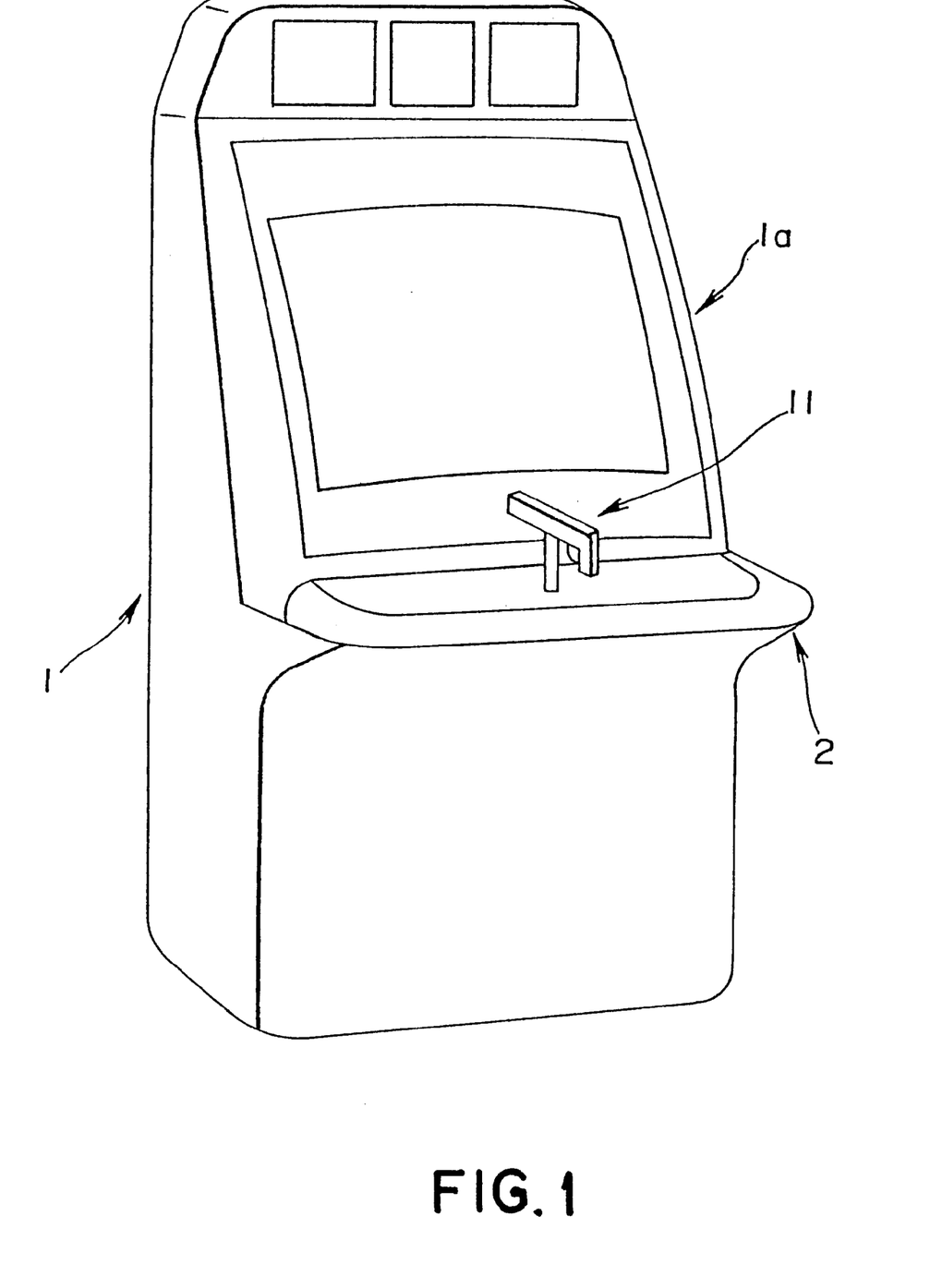
FIG. 1 is an exterior view of the image generating device of the present embodiment.

FIG. 1 shows the exterior of this image generating device. In this drawing, numeral 1 indicates the main game device. This main game device 1 has a box-like shape, and is provided with display 1a on the front surface. Speaker installation holes (omitted from drawing) are provided on the side of display 1a, and speaker 14 is installed in the interior of these holes.

Operating panel 2 is provided on the front surface below display 1a, and gun unit 11 is provided on this operating panel. Gun unit 11 possesses a trigger, and this gun unit 11 is operated by the player.

Inside main game device 1, a game processing board is provided. Display 1a, gun unit 11 of operating panel 2, and the speaker are connected to game processing board 10. Accordingly, the player may enjoy the gun shooting game by using display 1a and gun unit 11 on operating panel 2.

Figure 2:
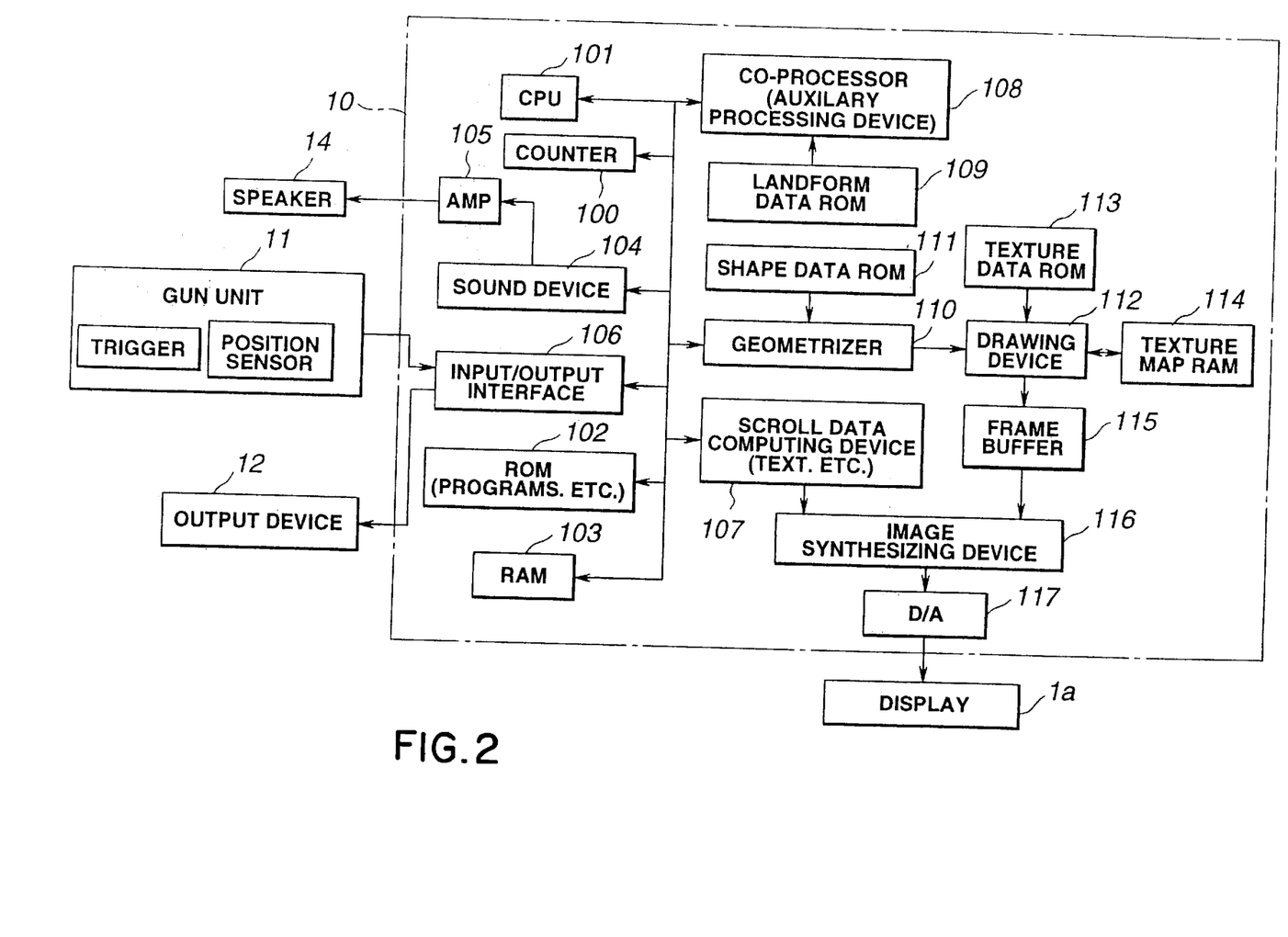
FIG. 2 is a block diagram of the image generating device of the present embodiment.

FIG. 2 is a block diagram of the image generating device of the present embodiment. This game device comprises an outline, display 1a, gun unit 11, game processing board 10, and speaker 14.

Game processing board 10 possesses counter 100, CPU (central processing unit) 101, ROM 102, RAM 102, RAM 103, sound device 104, input/output interface 106, scroll data computing device 107, co-processor (auxiliary processing unit) 108, landform data ROM 109, geometrizer 110, shape data ROM 111, drawing device 112, texture data ROM 113, texture map RAM 114, frame buffer 115, image synthesizing device 116, and D/A converter 117.

CPU 101 is connected via bus line to ROM 102, wherein prescribed programs and image processing programs are stored, RAM 103, which stores data, sound device 104, input/output interface 106, scroll data computing device 107, co-processor 10S, and geometrizer 110. RAM 103 functions as a buffer, wherein various commands for the geometrizer (indications of objects, etc.) and data required in various computing are inputted.

Input/output interface 106 is connected to gun unit 11, and the operating signal of the position of gun unit 11 etc. are provided to CPU 101 as digital data. Sound device 104 is connected to speaker 14 via power amplifier 105, wherein sound signals generated in sound device 104 are transferred to speaker 14 after being power amplified.

CPU 101 of the present operation, based on the programs stored in RON 102, reads the operating signals from operating device 11, and diagram data from diagram data ROM 109, or, motion data from motion data ROM 111 ("enemy characters, etc.") and (three-dimensional data of "background, such as land shape, sky, various structural objects, etc."), and implements at least, the calculation of action calculations (simulation) as well as the calculation of special effects.

The action calculations are for simulating the movements of the enemies in the imaginary space, and after the coordinate values in the three-dimensional space have been decided, a conversion matrix for converting these coordinate values to a field of view coordinate system and shape data (polygon data) are designated to the geometrizer. Diagram data ROM 109 is connected to co-processor 108, and consequently, predetermined diagram data are transferred to co-processor 10B (and CPU 101). Co-processor 108 is devised such that it mainly undertakes floating-point calculations. As a result, various decisions are executed by co-processor 108, and the results of these decisions are provided to CPU 101, thereby enabling the calculation load of CPU to be reduced.

Geometrizer 110 is connected to motion data ROM 111 and drawing device 112. In motion data ROM 111, shape data consisting of a plurality of polygons (three-dimensional data of characters, landform, background, etc., comprised of each vertex thereof) are stored in advance, and these shape data are transferred to geometrizer 110. Geometrizer 110 implements perspective conversion of the specified shape data using the conversion matrix supplied by CPU 101, thereby receiving data converted from a coordinate system in the imaginary three-dimensional space to a field of view coordinate system. Drawing device 112 applies texture to the converted field of view coordinate system shape data, and outputs it to frame buffer 115. To conduct this texture application, drawing device 112 is connected to texture data ROM 113 and texture map RAM 114, as well as being connected to frame buffer 115. Incidentally, polygon data refers to data groups for the relative or absolute coordinates of each vertex in a polygon (multi-sided shape: mainly, three- or four-sided shapes) consisting of a group of plurality of vertices Diagram data ROM 109 stores relatively broad polygon data settings which are sufficient for executing the prescribed functions. Contrarily, motion data ROM 111 stores more precise polygon data settings relating to shapes constituting screens such as enemies and background.

Scroll data computing device 107 is for computing scroll screen data, such as text (stored in ROM 102), and this computing device 107 and frame buffer 115 arrive at display 1a via image synthesizing device 116 and D/A converter 117. Thereby, polygon screens (simulation results) of enemies, landform (background), etc., temporarily stored in frame buffer 115 and scroll screens for the required text information are synthesized in a designated priority to create the final game image. This image data is converted to an analog signal by D/A converter 117 and sent to display 1a, and the game image is indicated on a real time basis.

The programs and data required for CPU 101 device in FIG. 2 to operate are provided by various methods. For example, there is a method of inserting the ROM into the prescribed circuit base, after inputting required programs and data into the ROM, which is a semiconductor memory. Further, there is a method of having a floppy disk drive (FDD), which is not shown, read in the floppy diskette in which required programs and data are inputted, and developing the required programs and data on the main memory of CPU 101. In addition, there is a method of comprising a hard disk in which required programs and data are inputted, and developing the required programs and data on the main memory upon reading the data from this hard disk at the time of power input. Moreover, there is a method of comprising a communication means, such as a modem, and developing the required programs and data on the main memory via telephone circuit, ISDN circuit, optical fiber, etc. The article used to provide the required programs and data in these methods is called a medium.

A medium, for example, includes a floppy disk, hard disk, magnetic taper photomagnetic disk, CD-ROM, DVD, ROM cartridge, RAM memory cartridge with battery back-up, flash memory cartridge, fixed RAM cartridge, etc. Also included are telecommunication mediums such as telephone circuits, etc., which are wire communication mediums, and microwave circuits, etc., which are radio communication mediums. The internet is also included in the telecommunication medium stated herein.

A medium has information (mainly digital data or programs) stored therein by some physical means, and is capable of implementing the prescribed functions in a processing device such as a computer, exclusive processor, etc. That is, any means which downloads the program onto a computer and executes the prescribed functions is fine.

Figure 3:
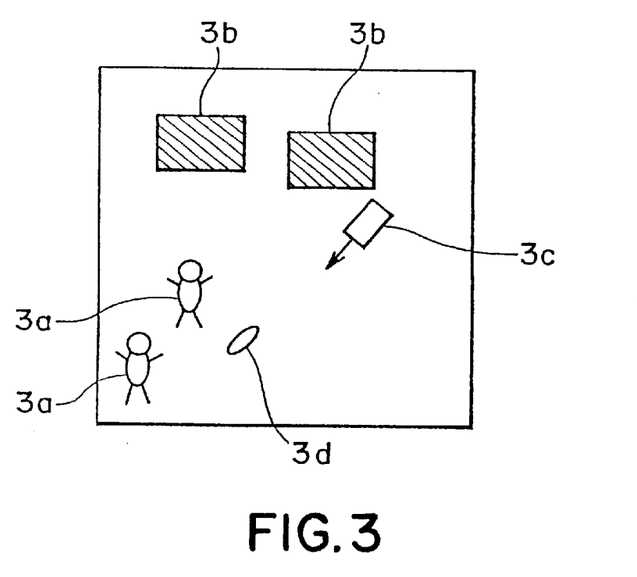
FIG. 3 is a conceptional diagram of the game space of the present embodiment.

FIG. 3 is a conceptional view of the game space of the present embodiment. This game space is an imaginary three-dimensional space, which includes images of enemy (moving object) 3a, obstacle 3b, viewpoint 3c, bullet 3d, etc. Enemy 3a is the target, which dodges bullets fired from the viewpoint, moves autonomously, and begins to attack toward the viewpoint. Further, there are a plurality of enemy 3a existing within the game space. Obstacle 3b, for example, is a structural object such as containers and buildings, and is provided to give variation to the game. Enemy 3a and viewpoint 3c are able to move within the game space without colliding to this obstacle 3b.

Viewpoint 3c is the viewpoint of the player, and is provided on the aircraft body of helicopters, etc. That is, the game space seen from the viewpoint is indicated on display 3a, and the player may indulge in the feeling of, as though, looking down at the game space from a helicopter. Since this viewpoint flies (moves) within the game space while following the enemy, the enemy is continuously indicated on the display with an optimum composition. Further, symbol 3d of the same diagram indicates the bullet fired from the viewpoint. By the player pulling the trigger of gun unit 11, bullet 3d is fired toward the enemy.

Figure 4:
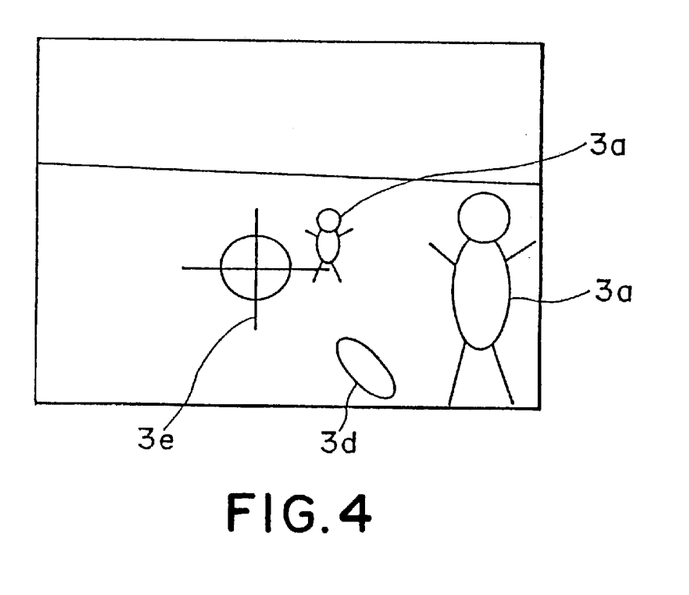
FIG. 4 is a diagram showing an example of the game screen of the present embodiment.

FIG. 4 shows an example of a game screen of the present embodiment. This game screen indicates a game space seen from the view point, and is actually indicated on the display. Elevation 3e is displayed in the game screen, and the position of elevation 3e in the game screen is moved by the player changing the direction of gun unit 11. If elevation 3e overlaps with enemy 3a and the trigger is pulled, the bullet is fired toward enemy 3a.

Working
Main Processing

Figure 5:
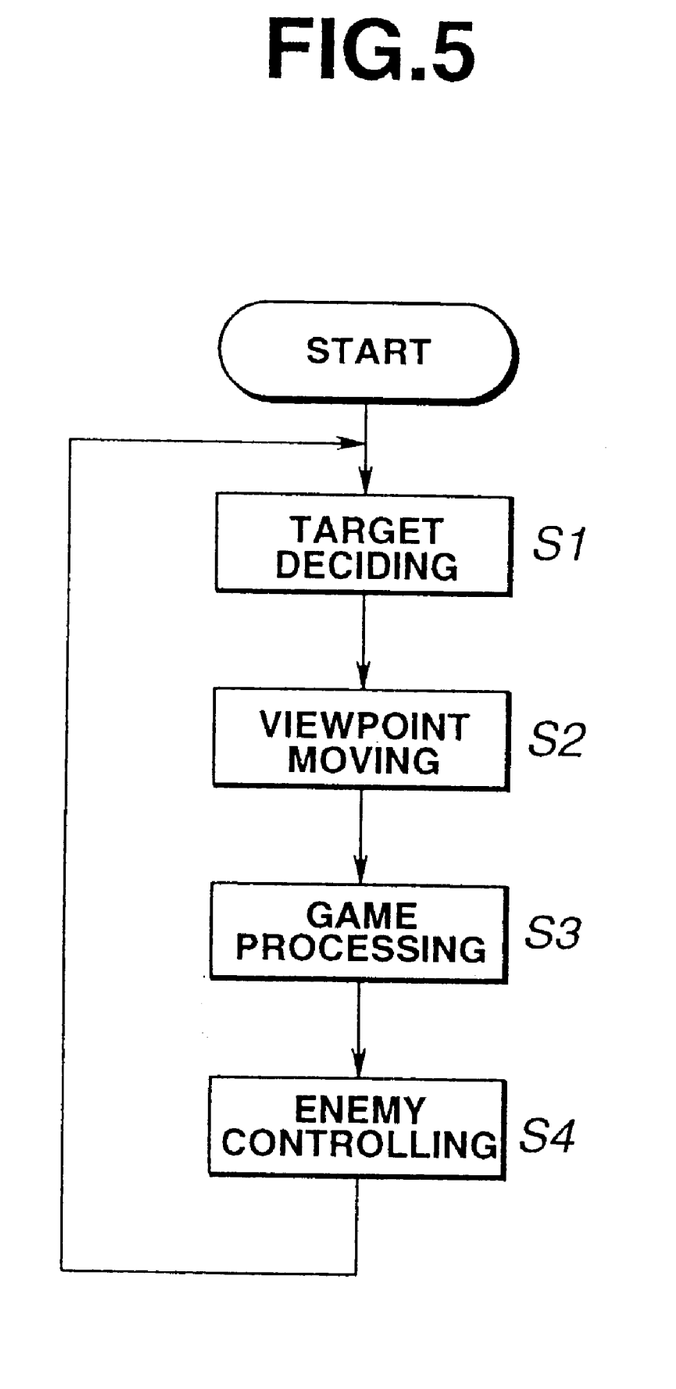
FIG. 5 is the main routine indicating the working of the image generating device of the present embodiment.

Next, the working of the image generating device in the present embodiment is explained. FIG. 5 indicates the main routine of image generating in the present embodiment.

This main routine is repeatedly executed every one field (1/60 sec.). In this main routine, CPU 101 decides the enemy to become the target of the viewpoint among the plurality of enemies (step S1). In the early stages of the game, the target is established against a predetermined enemy, and a game space with this enemy in the center is indicated on the display. However, together with the development of the game, the target gradually moves to a another enemy.

CPU 101 moves the viewpoint (step S2) toward the target decided in step S1. When the enemy escapes from the viewpoint (helicopter), the viewpoint follows this enemy. To make the composition of the enemy on the display an optimum one, the viewpoint moves to an optimum position against the enemy. For example, by moving the viewpoint so that the distance between the enemy and the viewpoint is nearly standardized, the size of the enemy in the game screen will be nearly standardized.

In step S3, CPU 101 executes various game processing. That is, together with deciding the screen of the game space seen from the coordinates of the viewpoint decided in step S2, CPU 101 detects the situation of the trigger of gun unit 11 and the position sensor. Further, CPU 101 moves the elevation on the display, and implements the decision of collision of the bullet and the enemy, or the obstacle, etc.

In step S4, CPU 101 decides the movement of each enemy according to the bullet fired by the player, according to the situation of the game, etc. For example, if a bullet lands near the enemy, that enemy is moved in a direction away from the impact area. Thereafter, CPU 101 returns to step S1, and repeatedly executes the processing of steps S1 to S4.

Next, the above target deciding processing (step S1), viewpoint moving processing (step S2), and enemy controlling processing (step S4) are explained in detail.

Target Deciding Processing

Figure 6:
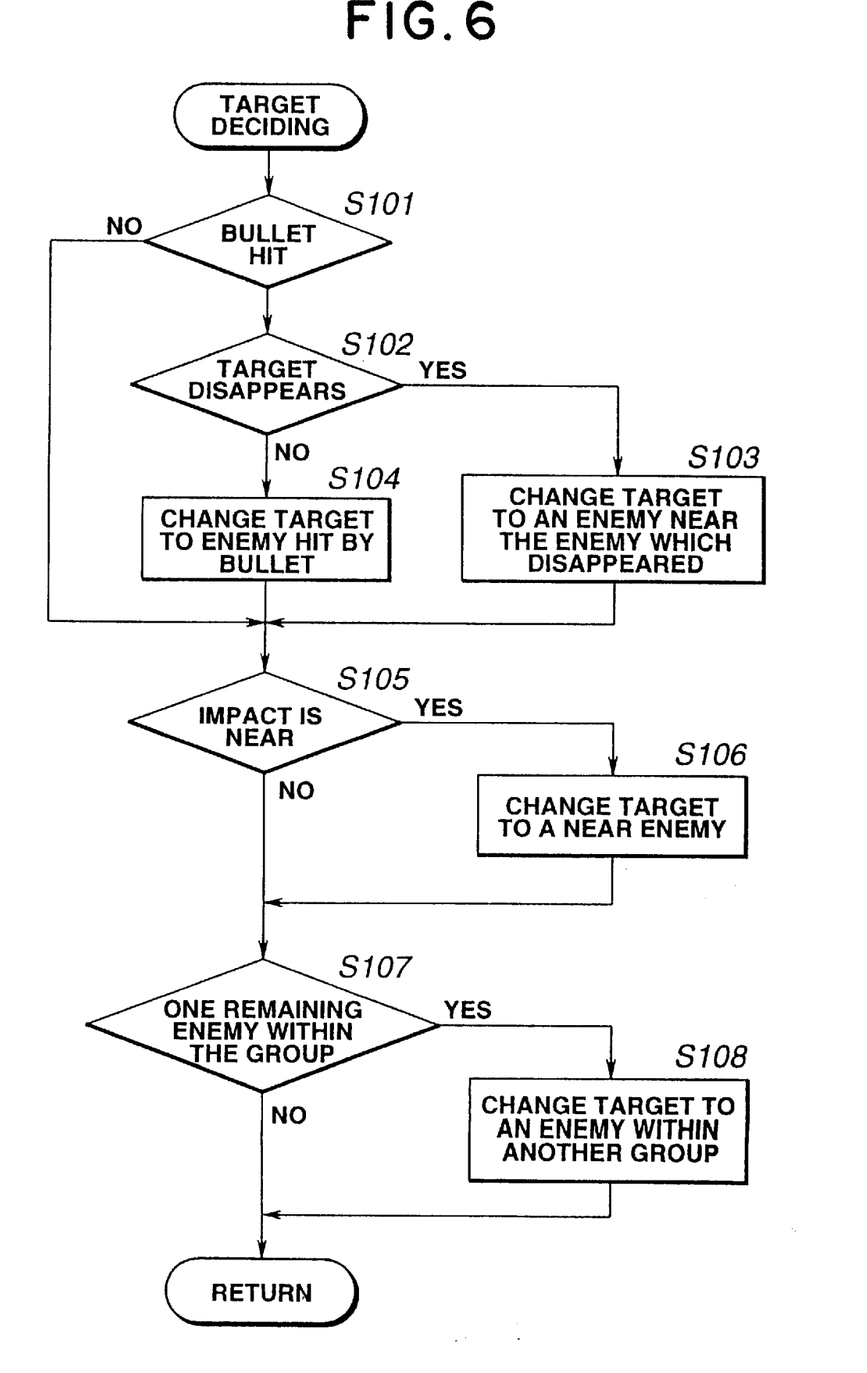
FIG. 6 is a flowchart indicating the target deciding processing of the image generating device of the present embodiment.

FIG. 6 is a flowchart indicating above target deciding processing (step S1). Target deciding processing is implemented by calculating the priority ranking of each enemy and deciding the enemy with the highest priority ranking as the target. The following explanation is a simplified explanation of this processing. As stated above, in the early stages, the target is established to a predetermined enemy. For example, the attacked enemy is selected. In the flowchart of the same diagram, CPU 101 judges whether or not the bullet has hit the enemy (step S101), and if the result is YES, it further judges whether or not the target enemy has disappeared (step S102). If the imaginary life power of the enemy becomes zero and the target enemy disappears (YES in step S102), CPU 101 establishes the target to the enemy nearest to the enemy which disappeared. Contrarily, if the bullet did hit but the enemy has not disappeared (NO in step S102), the target is established to the enemy which was hit by the bullet (step S104).

Further, if the bullet does not hit the enemy (NO in step S101) but lands near the enemy (YES in step S105), the target is established to the enemy nearest to the impact area. However, if the distance between the target enemy and the impact area exceeds the predetermined value, the target enemy does not change. Therefore, if the impact area is a great distance from the target enemy, the unnaturalness of the target moving to an enemy nearest to the impact area may be avoided.

Moreover, in step S107, if there is only one enemy left within the group, CPU 101 transfers the target to an enemy in another group (step S108). When the above processing is complete, CPU 101 returns to the main routine (FIG. 5).

Figure 9:
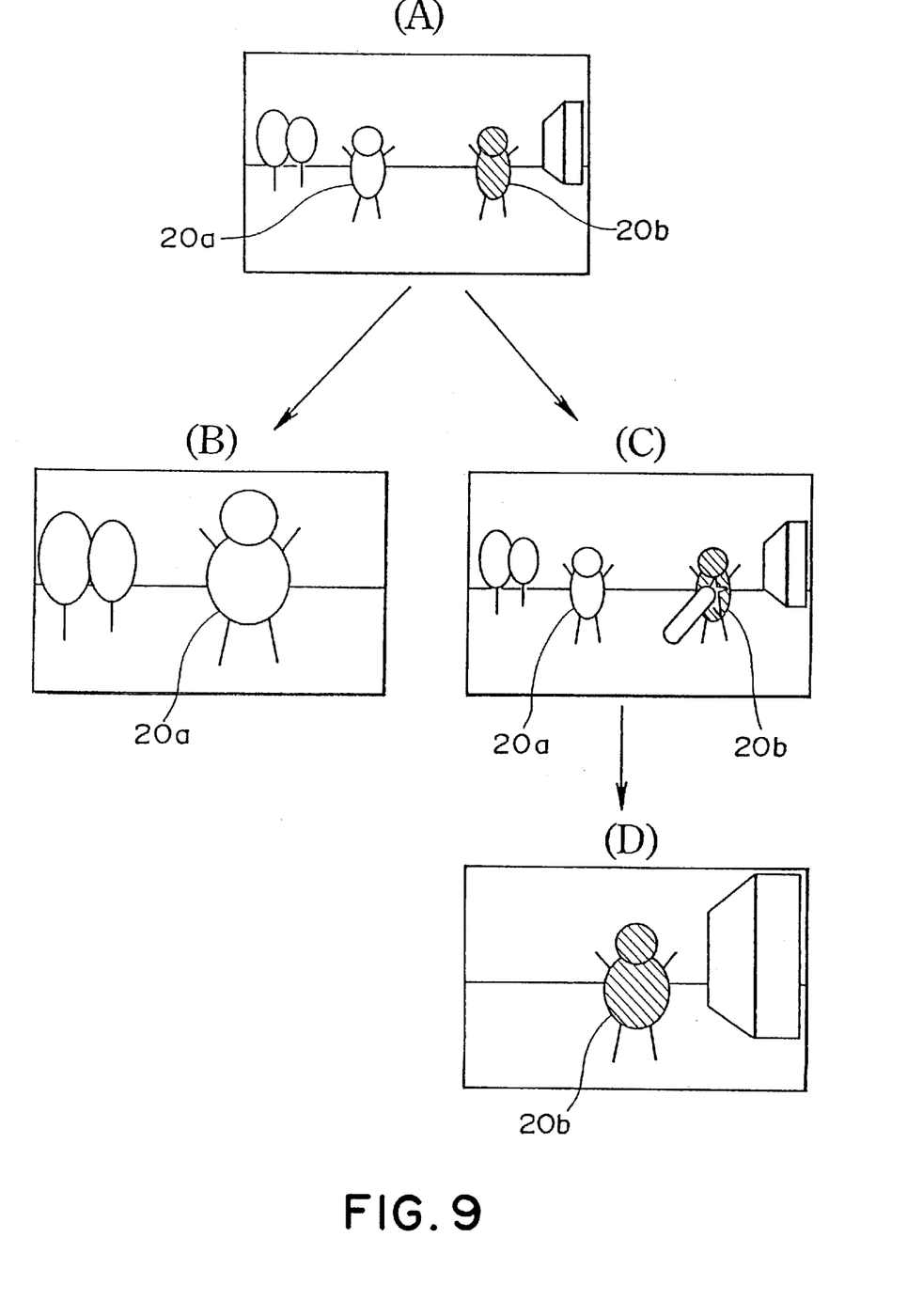
FIG. 9 is a diagram explaining the target deciding processing of the image generating device of the present embodiment.

The above target deciding processing is explained by presenting specific examples. In FIG. 9(A), enemy 20a and 20b exist within the game space, and let it be presumed that enemy 20a is established as the target of viewpoint. Here, if the player does not fire the bullet, the target is not changed, and the target remains established on enemy 20a. Therefore, a game screen with enemy 20a as the target of viewpoint is indicated on the display ((B) of same Fig.).

However, if the bullet fired by the player hits enemy 20b ((C) of same Fig.), the target of viewpoint moves from enemy 20a to enemy 20b, and a game screen with enemy 20b as the target of viewpoint is indicated on the display ((D) of same Fig.). Thus, because the target of viewpoint automatically moves to the enemy the player is trying to battle, the game screen desired by the player may be provided.

Further, as a method for changing the target, the target may be established by raising the priority ranking of the enemy which is trying to attack the player. In addition, the priority ranking of the enemy with the highest attacking ability, the enemy which overlapped with the elevation, the enemy which is positioned nearest to the elevation, the enemy which is established as the "Boss" in advance, etc., may be raised. Moreover, as a general rule, by not changing the target until the target enemy disappears, and as an exception, if the prescribed time is exceeded after the enemy becomes the target, the target may be changed.

Viewpoint Moving Processing

Figure 10:
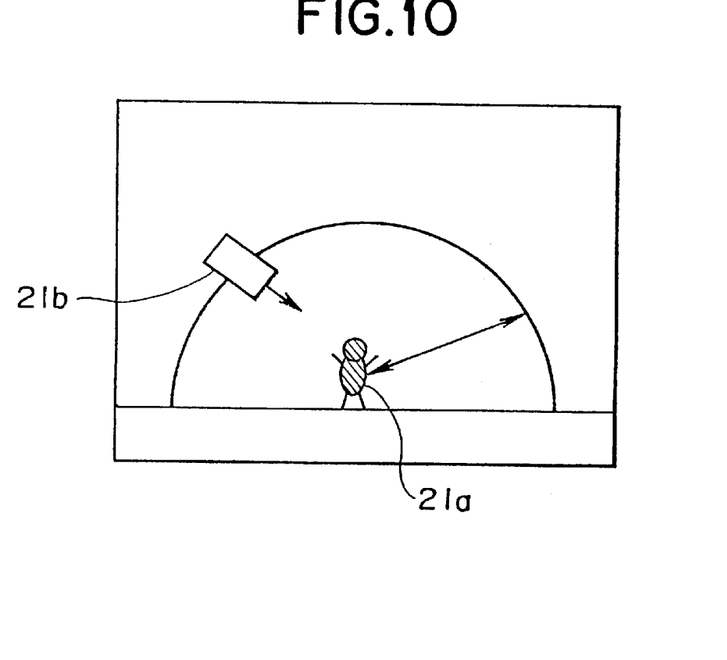
FIG. 10 is a diagram explaining the viewpoint moving processing of the image generating device of the present embodiment.
Figure 11:
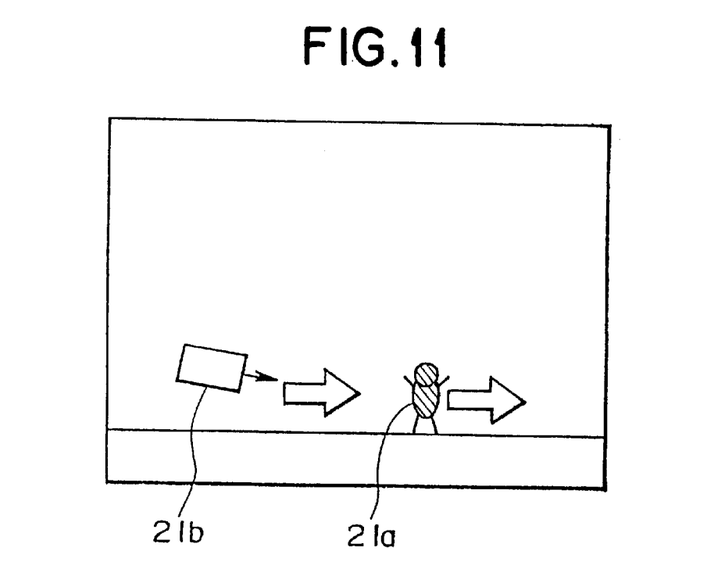
FIG. 11 is a diagram explaining the viewpoint moving processing of the image generating device of the present embodiment.

Next, above viewpoint moving processing (step S2 of FIG. 5) is explained by referring to FIG. 7, and FIG. 10 to FIG. 13. Foremost, the outline of viewpoint moving processing is explained using FIG. 10 and FIG. 11. As shown in FIG. 10, viewpoint 21b moves in a position distance D away from target enemy 21a. Further, in order for the game screen to have variation, viewpoint 21b continuously moves in the game space while maintaining distance D from enemy 21a. Therefore, the processing of the viewpoint so that it moves along the hemisphere of radius D with target enemy 21a in the center is implemented. Moreover, as shown in FIG. 11, when target enemy 21a moves, viewpoint 21b also follows enemy 21a. Therefore, target enemy 21a is continuously indicated on the display in an optimum composition.

Figure 7:
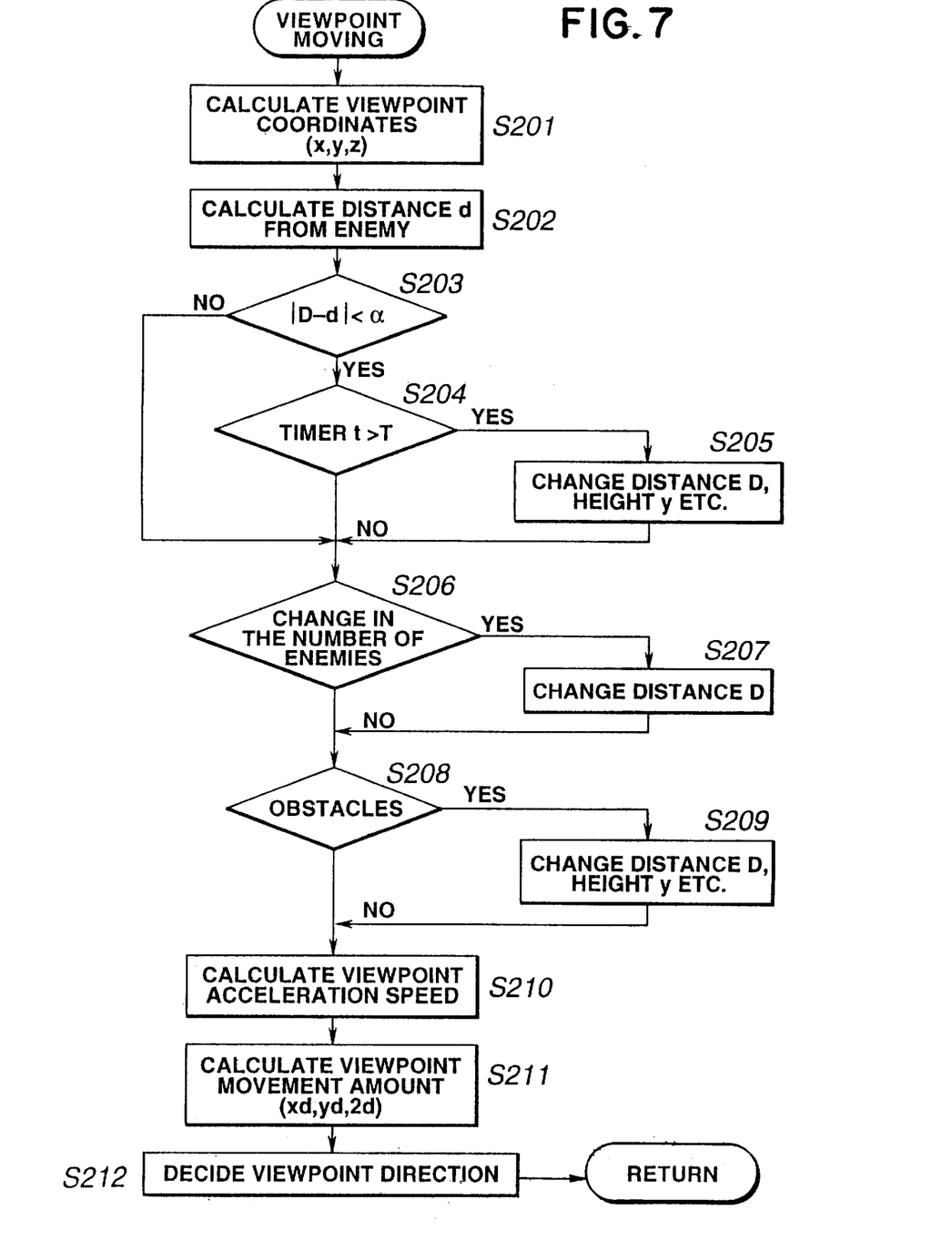
FIG. 7 is a flowchart indicating the viewpoint moving processing of the image generating device of the present embodiment.

Following, details of above viewpoint moving processing is explained by referring to the subroutine of FIG. 7. In this flowchart, foremost, CPU 101 calculates the coordinates (x, y, z) of the present viewpoint (step S201) and calculates distance d from the target enemy to the viewpoint (step S202). If the absolute value of the difference between this distance d and predetermined distance D subsides within α, in other words, if the value of distance d approximates to distance D (YES in step S203), step S204 is executed.

In step S204, CPU 101 judges whether or not timer t has exceeded the predetermined timer closing value T. In other words, if t, which is the time of the viewpoint existing in a position distance D from the enemy, exceeds prescribed time T (YES in step S204), distance D or coordinate y in the direction of the viewpoint height will be changed (step S205). Thereby, the viewpoint will not exist in the same position exceeding the prescribed time, enabling a game screen with variations.

Next, CPU 101 judges whether or not the number of enemies have been changed (step S206), and if the result of the judgment is YES, it changes distance D. For example, if a fairly large number of enemies are to be indicated on the screen, it is necessary to indicate all of these enemies on the display, including the target enemy. Therefore, distance D between the viewpoint and the target being fairly long is favorable. However, if the number of enemies decrease and there is only one enemy left to be the target, indicating the enemy largely on the display is favorable. Accordingly, in this case, distance D is established short a Following, in step 8208, CPU 101 judges whether or not there are any obstacles in the proceeding direction of the viewpoint. If the result of the judgment is YES, CPU 101 changes distance D, viewpoint height y, etc., and avoids the viewpoint from colliding with the obstacles (step S209).

Thereafter, CPU 101 calculates the acceleration speed of the viewpoint (step S210), and calculates the moving amount (xd, yd, zd) of the viewpoint based on this acceleration speed (step S210). Here, the moving direction of the viewpoint is decided (step S212) by suspending a sudden acceleration speed being added to the viewpoint. As a result, the viewpoint coordinates of the moving target (x+xd, y+yd, z+zd) are acquired. After the completion of the above viewpoint moving processing, CPU 101 returns to the main routine of FIG. 5.

Figure 12:
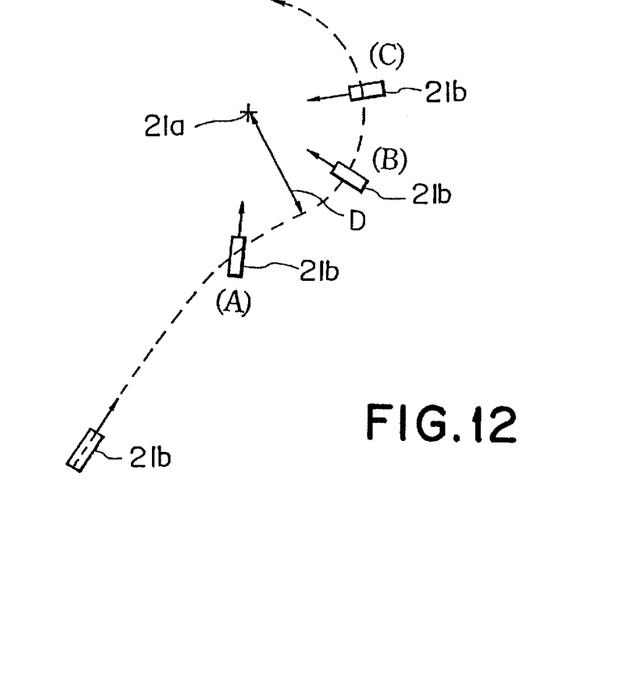
FIG. 12 is a diagram explaining the viewpoint moving processing of the image generating device of the present embodiment.
Figure 13:
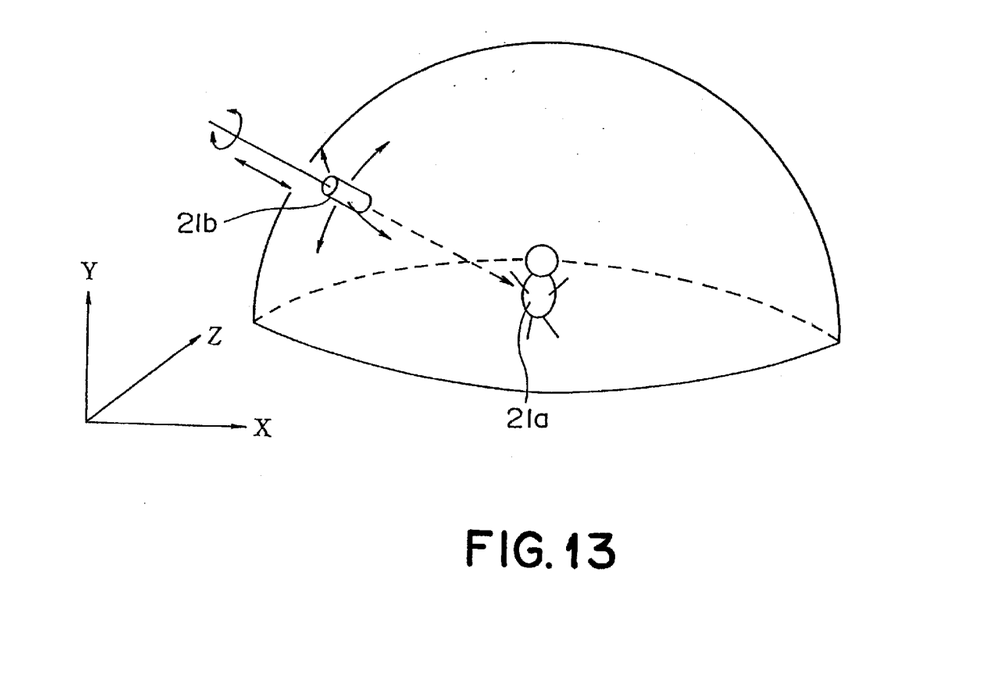
FIG. 13 is a diagram explaining the viewpoint moving processing of the image generating device of the present embodiment.

FIG. 12 and FIG. 13 of the above viewpoint moving distance is explained by presenting specific examples. In FIG. 12, if viewpoint 21b is positioned at a distance against enemy 21a, viewpoint 21b moves in a direction approaching against enemy 21a. In position (A), viewpoint 21b changes the moving direction while facing the viewpoint toward enemy 21a. Here, the moving direction of viewpoint 21b is decided to the direction in which the acceleration speed is not sudden. In other words, the viewpoint will not move in the opposite direction to the direction of the viewpoint movement shown in this diagram, that is, the viewpoint will not suddenly proceed into a clockwise direction from the position on the hemisphere of radius D with enemy 21a in the center. Thereby, a game screen in which the player does not feel uncomfortable is indicated. When the distance between viewpoint 21b and enemy 21a becomes D, viewpoint 21b moves on the spherical surface of radius D with enemy 21a in the center (position (C)).

In addition, if viewpoint 21b revolves with enemy 21a in the center, the viewpoint revolves with the axis as its center (FIG. 13), and the horizon is indicated on the game screen slanted. Thereby, the operator is able to enjoy the feeling of as if riding on a helicopter.

Enemy Controlling Processing

Figure 8:
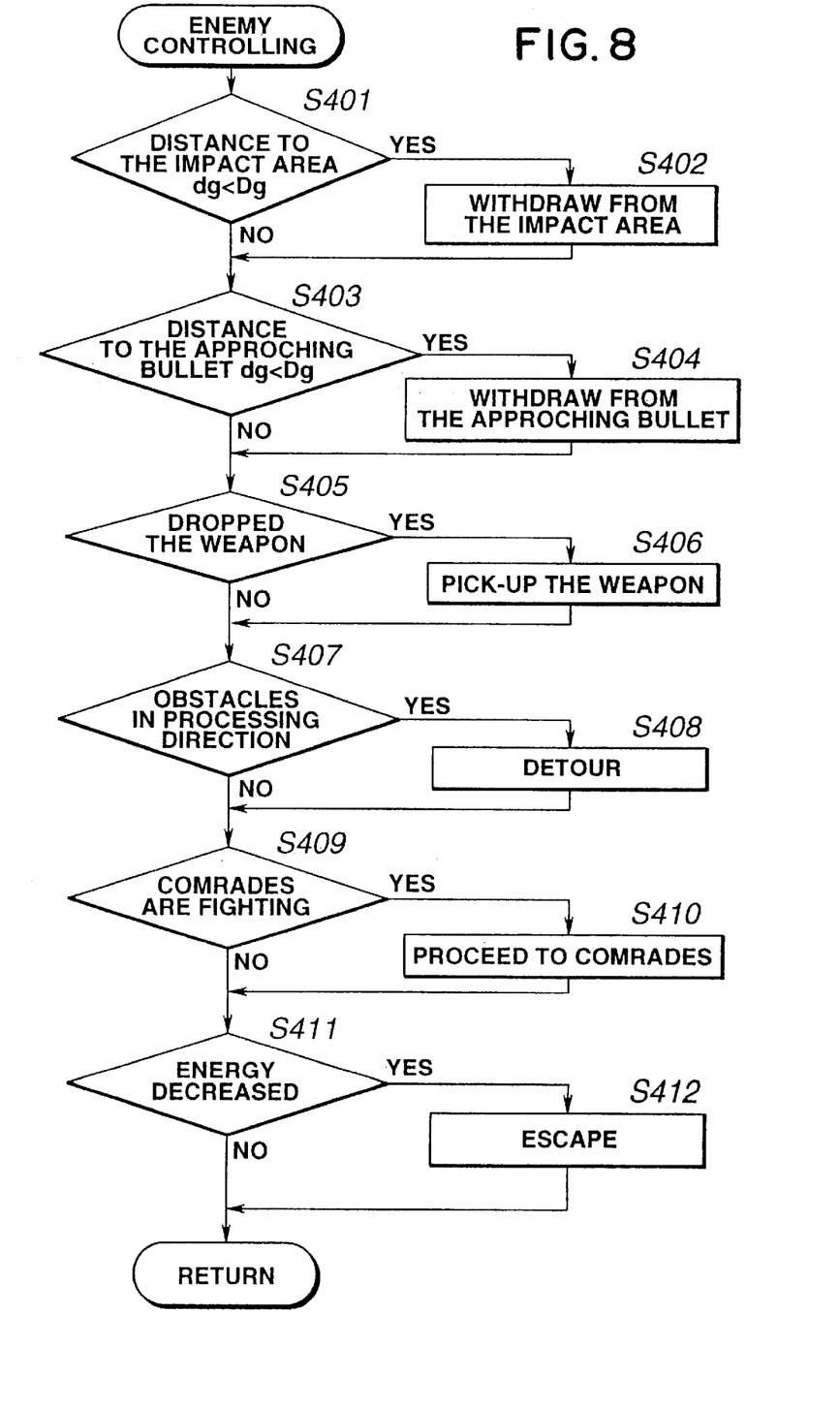
FIG. 8 is a flowchart indicating the enemy controlling processing of the image generating device of the present embodiment.
Figure 14:
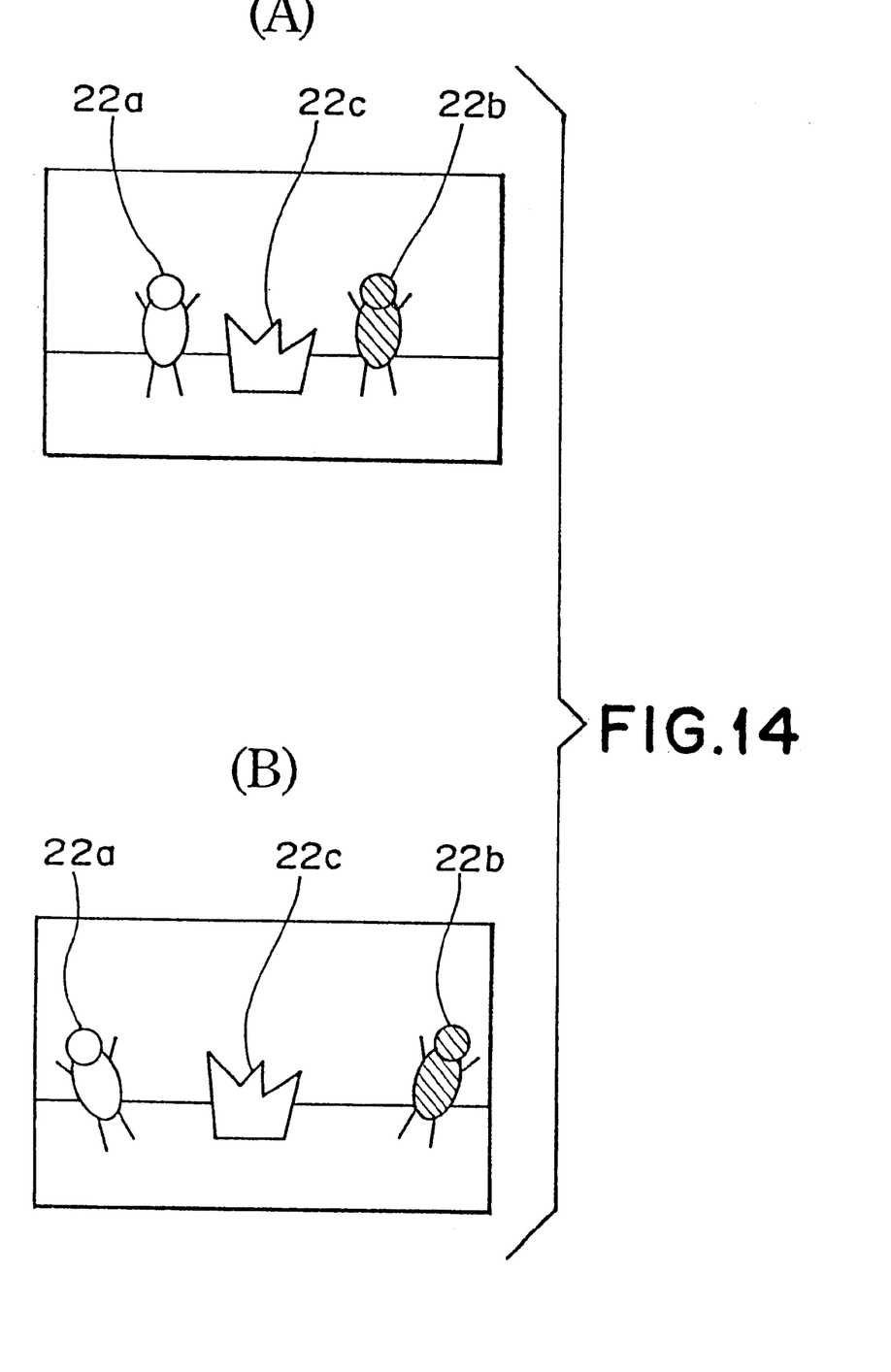
FIG. 14 is a diagram explaining the enemy movement controlling processing of the image generating device of the present embodiment.

Next, enemy controlling processing (step S4 of FIG. 5) is explained by referring to FIG. 8 and FIG. 14. In the image generating device of the present embodiment, the movement of the enemies are not programmed in advance, and each enemy acts autonomously according to the situation of each enemy in the game space.

Below, enemy controlling processing is explained by referring to the subroutine shown in FIG. 8. CPU 101 calculates distance d g of the impact area and each enemy individually, and judges whether or not each distance d g is smaller than predetermined distance D g (step S401). In other words, if the impact is near the enemy, CPU 101 implements the processing of withdrawing each enemy from the impact area (step S402).

Further, if distance d g between the approaching bullet and each enemy is smaller than predetermined distance D g (YES in step S403), CPU 101 withdraws each enemy from the approaching bullet (step S404). If the enemy drops its weapon within the game space (YES in step S405), CPU 101 makes that enemy pick up the weapon (step S406).

Moreover, if there are any obstacles in the proceeding direction of the enemy (YES in step S 407), CPU 101 makes the enemy detour the obstacle (step S408), and if the comrade enemies are making a resistance (YES in step S409), CPU 101 makes the enemy support its comrades by moving it toward the comrade enemies (step S410). Further, if the energy of the enemy has decreased (YES in step S410), CPU 101 implements the processing of that enemy escaping from the attacking side (viewpoint) (step S412). Thereafter, CPU 101 returns to the main routine of FIG. 5.

The above enemy controlling processing is explained by presenting specific examples. In FIG. 14 (A), let it be presumed that the impact was near enemy 22a and 22b. In addition, symbol 22c of the same FIG. indicates the explosion of the impact. Thereupon, enemy 22a and 22b withdraw from the impact area ((B) of same Fig.). Further, if the enemy is moving or making a counter attack, it is continuously facing the player side (viewpoint side). However, in such cases as the enemy falling down, the enemy will not face the viewpoint side. In this matter, each enemy acts autonomously while judging its own situation. Therefore, the movements of the enemies will change variously according to the development of the game, and the player may enjoy a game with variations.

As explained above, with the image generating device and the image generating method of the present invention, the following effects may be obtained.

Foremost, such as enemies implementing diverse viewpoint movements according to the situation of the game, a game screen with plentiful changes may be provided. In other words, the direction of viewpoint movement etc. is decided according to the situation of the game, and the viewpoint moves toward this direction etc. Therefore, because a different game screen is developed for each game, the player is able to enjoy a game with plentiful changes.

In addition, because the viewpoint moves (flies) on the game space while following the enemy, the player is able to enjoy the feeling of as it following the enemy while riding on a helicopter.

Secondly, by continuously moving the viewpoint against the enemy to an optimum position, it is possible to provide an appealing game screen. For example, according to the present invention, the viewpoint moves in the vicinity of the imaginary spherical surface with the target enemy in the center. Therefore, the enemy may be displayed in an optimum composition on the game screen. Further, together with the decrease in the number of enemies, the radius of the imaginary spherical surface decreases. In other words, since the radius of the imaginary spherical surface grows larger if there are many moving objects, more moving objects may be indicated, and since the radius grows smaller if there are less moving objects, the moving objects as the viewpoint target may be largely indicated.

Moreover, by adjusting the viewpoint to an enemy with high attacking power, etc., the player may be informed as to which enemy should be preferentially attacked.

Furthermore, by calculating the acceleration speed of the viewpoint, and by controlling the acceleration speed from becoming excessive, the direction of viewpoint movement is decided. Thereby, the viewpoint may be moved smoothly, and the uncomfortableness of the player may be reduced.

Thirdly, by letting the movements of the enemies have versatility, it is possible to actualize a game development with plentiful changes. In other words, by deciding the movements of the enemies according to the situations which the enemies are in, within the game space, they may move autonomously and diversely. For example, if the point of impact is near the enemy, the enemy withdraws away from the impact area. Thus, since the enemies implement various movements autonomously due to the bullets fired from the player, etc., a diverse game may be provided for each game.

What is claimed is:

1. An image generating device which generates images of moving objects moving within an imaginary three-dimensional space captured from a viewpoint within said imaginary three-dimensional space, comprising a processing means including:
   a viewpoint moving means for causing said viewpoint to follow said moving objects;
   a generating means for generating at least one predetermined situation in the presence of said moving objects;
   a detecting means for detecting said at least one predetermined situation of said moving objects; and
   a control means for automatically implementing control of the movement of said viewpoint on the basis of the detection of the predetermined situation without input of the user of the device.

2. An image generating device according to claim 1, wherein said viewpoint moving processing means calculates the acceleration speed of said viewpoint, and in a range of said acceleration speed not exceeding a prescribed value, moves said viewpoint.

3. An image generating device according to claim 1, wherein said viewpoint moving processing means changes the position of said viewpoint if said viewpoint is positioned on the same coordinates in excess of a prescribed time.

4. An image generating device according to claim 1, wherein said viewpoint moving processing means moves said viewpoint in the vicinity of an imaginary spherical surface with said moving object in the center.

5. A medium which stores a program to function the computer as said viewpoint moving processing means according to claim 5.

6. An image generating device according to claim 1, comprising a target deciding means which selects one from a plurality of said moving objects based on predetermined standards, targeting this moving object from the view point.

7. An image generating device according to claim 6, wherein said target deciding means, within the plurality of moving objects, targets the moving object attacking the viewpoint.

8. An image generating device according to claim 6, wherein said target deciding means, within the plurality of moving objects, targets the moving object nearest to the impact area from the viewpoint.

9. A medium which stores a program to function a computer as said target deciding means according to claim 6.

10. An image generating device according to claim 1, comprising a moving object controlling means which indicates said moving object according to the situation of said moving object in the imaginary three-dimensional space.

11. An image generating device according to claim 10, wherein said moving object controlling means moves the other moving objects toward the moving object which is attacking against the viewpoint.

12. A medium which stores a program to function a computer as said moving object controlling means according to any one of claims 10.

13. An image generating device which generates images of moving objects moving within an imaginary three-dimensional space captured from a viewpoint within said imaginary three-dimensional space, comprising a viewpoint moving processing means for making said viewpoint follow said moving objects and for detecting the situation of said moving objects, implementing controlling of the movement of said viewpoint, said viewpoint moving processing means moving said viewpoint in the vicinity of an imaginary spherical surface with said moving object in the center, and said viewpoint moving processing means, together with the decrease in the number of said moving objects, decreases the radius of said imaginary spherical surface.

14. An image generating device which generates images of moving objects moving within an imaginary three-dimensional space captured from a viewpoint within said imaginary three-dimensional space, comprising a viewpoint moving processing means for making said viewpoint follow said moving objects and for detecting the situation of said moving objects, implementing controlling of the movement of said viewpoint, and a target deciding means which selects one from a plurality of said moving objects based on predetermined standards, targeting this moving object from the viewpoint, said target deciding means, if the number of moving objects of the moving object group made from a plurality of moving objects becomes less than a prescribed figure, moving the target from the viewpoint to a moving object in another moving object group.

15. An image generating device which generates images of moving objects moving within an imaginary three-dimensional space captured from a viewpoint within said imaginary three-dimensional space, comprising a viewpoint moving processing means for making said viewpoint follow said moving objects and for detecting the situation of said moving objects, implementing control of the movement of said viewpoint, and a moving object controlling means for indicating said moving object according to the situation of said moving object in the imaginary three-dimensional space, said moving object controlling means, if the point of impact is within a prescribed range from said moving object, withdrawing said moving object from the impact area.

16. An image generating method of generating images of moving objects moving within an imaginary three-dimensional space captured from a viewpoint within said imaginary three-dimensional space, comprising the steps of:

causing said viewpoint to follow said moving objects;

generating at least one predetermined situation in the presence of said moving objects;

detecting said at least one predetermined situation of said moving objects;

automatically implementing control of the movement of said viewpoint on the basis of the detection of the predetermined situation without input of the user of the device; and generating of said moving objects moving within the imaginary three-dimensional space from a viewpoint within the imaginary three-dimensional space.

17. A medium which stores a program to make a computer execute said following step, said situation generating step, said situation detecting step, said movement controlling step and said moving objects generating step according to claim 16.

* * * * *